United States Patent [19]
Smith et al.

[11] Patent Number: 6,161,751
[45] Date of Patent: Dec. 19, 2000

[54] METHOD OF JOINING METAL STRIP ENDS TOGETHER USING A CONSUMABLE INSERT

[75] Inventors: Lawrence W. Smith, Kingwood; Garry F. McClelland, Huffman; James R. Hyde, Dayton; Robert P. Badrak, Sugar Land; Raymond C. Rowland, Humble, all of Tex.

[73] Assignee: Precision Tube Technology, Inc., Houston, Tex.

[21] Appl. No.: 09/252,893

[22] Filed: Feb. 18, 1999

[51] Int. Cl.⁷ .......................... B23K 31/00; B23K 20/00; B23K 28/00; B23K 1/20; B23K 5/213
[52] U.S. Cl. .................. 228/125; 228/194; 228/199; 228/203
[58] Field of Search ............................ 228/125, 203, 228/199, 194

[56] References Cited

U.S. PATENT DOCUMENTS

| | | | |
|---|---|---|---|
| 4,286,744 | 9/1981 | Gullotti et al. | 228/125 |
| 4,863,091 | 9/1989 | Dubois | 228/147 |
| 5,045,668 | 9/1991 | Neiheisel et al. | 219/121.83 |
| 5,190,204 | 3/1993 | Jack et al. | 228/5.7 |
| 5,266,770 | 11/1993 | Noe | 219/121.63 |
| 5,456,405 | 10/1995 | Stagg | 228/147 |
| 5,515,707 | 5/1996 | Smith . | |

FOREIGN PATENT DOCUMENTS

| | | |
|---|---|---|
| 659900 | 10/1951 | United Kingdom . |
| 1047181 | 11/1966 | United Kingdom . |
| 1290932 | 9/1972 | United Kingdom . |

OTHER PUBLICATIONS

Arcos Alloys brochure entitled Consumable Weld Inserts, undated (admitted prior art)—8 pages.

Primary Examiner—Patrick Ryan
Assistant Examiner—Zidia T. Pittman
Attorney, Agent, or Firm—Renner, Otto, Boisselle & Sklar, LLP

[57] ABSTRACT

A method of joining the ends of metal strip material together by positioning a consumable insert of weld filler material between the full thickness of the strip ends and below the lower surface of the strip ends a predetermined depth to establish a predetermined gap between the strip ends thus allowing for full arc penetration of the strip ends and providing a supply of the filler material to the root of the weld to be formed between the strip ends.

20 Claims, 1 Drawing Sheet

U.S. Patent — Dec. 19, 2000 — 6,161,751
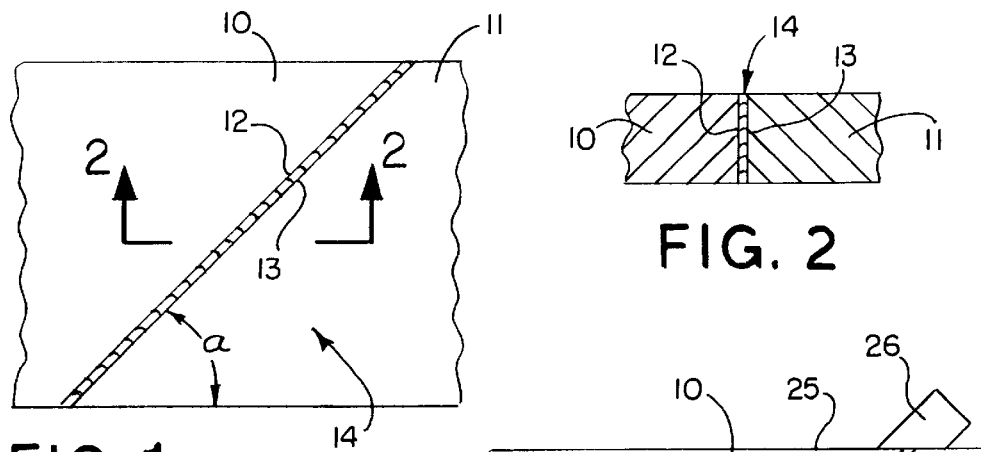
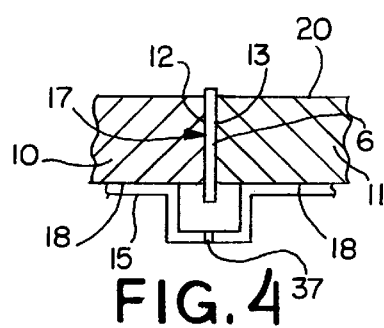
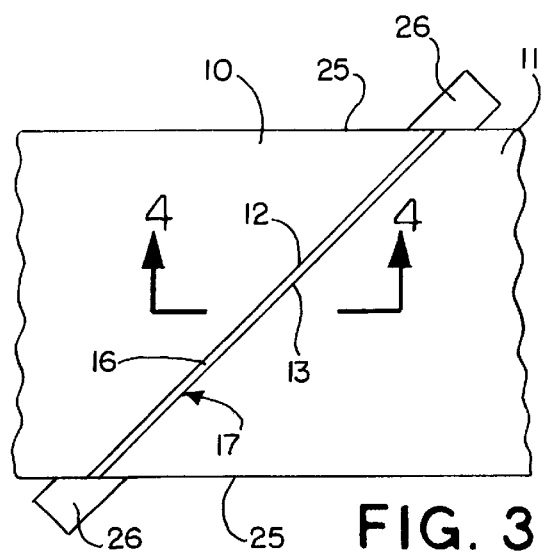
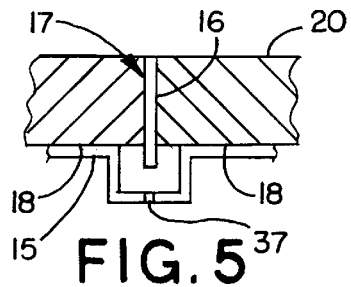
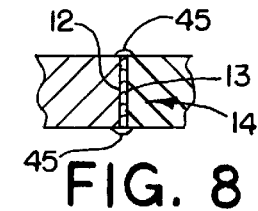
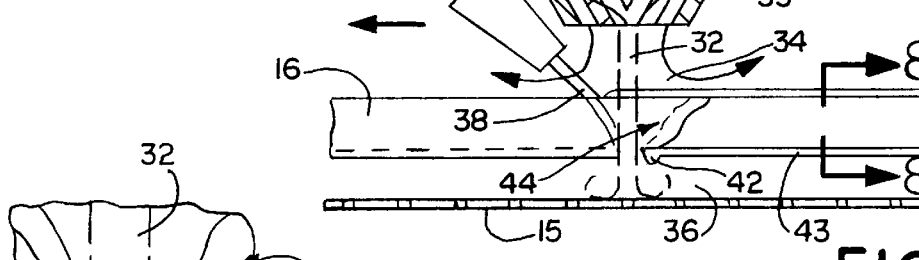
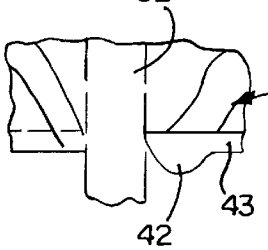
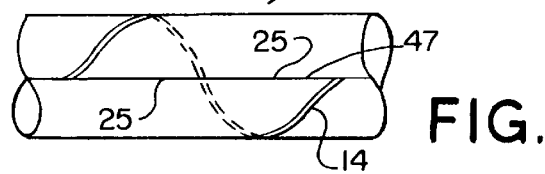

6,161,751

METHOD OF JOINING METAL STRIP ENDS TOGETHER USING A CONSUMABLE INSERT

FIELD OF THE INVENTION

This invention relates generally to a method of joining the ends of metal strip material together utilizing a consumable insert of weld filler material extending between the strip ends and below the lower surface of the strip ends to form a predetermined gap therebetween to improve the penetrating ability of a welding arc at the weld joint and provide a supply of weld filler material to the root of the weld.

BACKGROUND OF THE INVENTION

In manufacturing operations using metal strip material processes where continuous milling is performed, there is a need to join the metal strips together without disrupting the quality of the product for the continuous process. The usual method of joining metal strips together is to utilize an arc welding process either prior to or during the milling process. In many cases the strip end welds are eventually cut out of the final product and thus the only requirement for these strip end welds is that they maintain their mechanical integrity during milling of the strip material. However, in other instances the strip end welds become part of the final product, in which event not only are the strip end welds required to maintain mechanical integrity throughout the milling process, but they also must ultimately perform as well as the strip material in the final product.

When an extremely high quality weld is required, a variety of well known steps may be used in preparing the strip end joint for welding which may include using tabs to prevent burn out at the strip edges, cutting the strip ends at supplementary angles so that the weld joint is angled across the finished strip rather than being perpendicular to the strip side edges, and removing excess weld reinforcement to increase fatigue life of the weld joint and to facilitate forming of the strip.

For steel strips that are less than 0.200 inch thick, the common industry practice is to abut the strip ends together. When the strip thickness exceeds 0.200 inch, it becomes increasingly more common to either bevel the edges of the strip ends prior to welding or to leave a slight gap between the strip ends. These procedures facilitate full penetration of the weld through the full cross section of the joint.

If the strip ends are abutted, sufficient weld power must be used to allow the weld arc to completely penetrate the full cross section of the strip end joint. As the arc moves down the joint line, filler material is deposited in the molten pool created by the arc. The molten weld pool consists of the deposited filler metal and diluted parent metal from the strips. As the arc progresses along the joint line, the back of the weld pool cools and begins to solidify. During the solidification process, the strip material contracts and stresses occur that, in some cases, can actually result in cracks in the strip end weld.

SUMMARY OF THE INVENTION

In order to reduce the excessive heat input required to burn through metal strips when the strip ends are abutted, in accordance with one aspect of the invention, a gap is left between the strip ends that is filled with a consumable insert of weld filler material prior to welding the strip ends together.

In accordance with another aspect of the invention, the consumable insert provides accurate spacing of the strip ends and directs and stabilizes the weld arc through the full depth of the weld.

In accordance with another aspect of the invention, the consumable insert provides a supply of weld filler material to the full thickness of the weld, especially the root, making it possible to eliminate under and over-fill problems in the cap and root.

In accordance with another aspect of the invention, the consumable insert extends below the lower surface of the strip ends a predetermined depth to provide a consistent root fill by adding filler material to the root of the weld as needed.

In accordance with another aspect of the invention, as the weld is made, additional filler material is added from the upper surface of the weld while the portion of the consumable insert that extends below the lower surface is drawn into the weld thus ensuring complete fill of the weld root with less heat input.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary top plan view of a finished strip end weld made in accordance with the present invention;

FIG. 2 is a fragmentary longitudinal section through the strip end weld of FIG. 1, taken generally along the plane of the line 2—2 thereof;

FIG. 3 is a fragmentary top plan view showing two strip ends in alignment with each other with a consumable insert of weld filler material interposed between the strip ends prior to welding the strip ends together;

FIG. 4 is a fragmentary longitudinal section through the strip ends of FIG. 3 showing the consumable insert extending slightly above the upper surface of the strip ends and a preset depth below the lower surface of the strip ends;

FIG. 5 is a fragmentary longitudinal section through the strip ends similar to FIG. 4 but showing the top of the consumable insert machined flush with the upper surface of the strip ends;

FIG. 6 is a schematic fragmentary transverse section through the strip end joint of FIG. 3 showing a plasma arc welder moving along the joint line during the welding operation;

FIG. 7 is an enlarged schematic illustration of the weld puddle and solidification fronts of the strip end weld of FIG. 6;

FIG. 8 is a fragmentary longitudinal section through the strip end weld of FIG. 6 before removal of the excess weld reinforcement, taken generally along the plane of the line 8—8; and FIG. 9 is a fragmentary side elevation view of a length tubing made from two or more lengths of metal strip material joined together in accordance with the present invention.

DETAILED DESCRIPTION OF THE PREFERRED EMBODIMENT

Referring now in detail to the drawings and initially to FIGS. 1 and 2, two strips 10 and 11 of a suitable metal such as high strength low alloy carbon steel strip are shown with their ends 12 and 13 welded together and finished as described hereafter to provide a high quality, high strength strip end weld joint 14 that may be left in the final product without concern that the joint will prematurely fail.

FIGS. 3–5 show the strip ends 12 and 13 supported by a channel shaped backing plate or bar 15 in alignment with each other prior to welding. Interposed between the strip ends is a consumable insert 16 of suitable weld filler material to establish a gap 17 of a desired width therebetween. Providing a gap 17 between the strip ends reduces the heat input required to achieve full weld penetration when the strip ends are welded together using a conventional arc welder such as a plasma arc welder (PAW) or tungsten inert gas (TIG) welder. The consumable insert 16 extends the full thickness of the strip ends and below the lower surface 18 of the strip ends a predetermined depth to supply filler material to the full thickness of the weld, especially the root. The distance that the consumable insert extends below the lower surface of the strip ends is a function of the thickness of the strip material. That is, it is important that the consumable insert not extend too far below the lower surface of the strip ends in relation to their thickness so that the consumable insert is fully consumed during the welding procedure.

The thickness of the consumable insert 16 may vary from approximately five percent to ten percent of the strip thickness depending on the thickness of the strip material which may for example be between approximately 0.125 inch and 0.500 inch thick. If the strip material is approximately 0.134 inch thick or less, the consumable insert 16 may have a thickness of approximately 0.010 inch, whereas if the strip material has a thickness of more than 0.134 inch up to approximately 0.250 inch, the consumable insert may have a thickness of approximately 0.020 inch. Moreover, in all cases the consumable insert 16 extends substantially the entire width of the strip material. Also the consumable insert desirably initially extends slightly above the upper surface 20 of the strip ends as well as below the lower surface 18 of the strip ends to the desired depth (e.g., one-quarter inch for one-half inch thick strip material) as schematically shown in FIG. 4. Any portion of the consumable insert 16 extending above the upper surface 20 of the strip ends is then ground off or otherwise machined to make it flush with the upper surface of the strip ends prior to the strip welding operation as schematically shown in FIG. 5.

Before the consumable insert 16 is positioned between the strip ends, the strip ends may be straightened and sheared at supplementary angles, one of which (e.g., angle a of FIG. 1) is preferably between 15° and 45°, in order to reduce stress as much as possible on the weld joint.

The usual clamp chill blocks and alignment clamps (not shown) may be used to clamp and hold the strip ends in place against the backing plate 15 with the strip ends engaging opposite sides of the consumable insert 16.

To prevent burn out of the side edges 25 of the strip ends at the joint 14 during the welding operation, small tabs 26 preferably of the same base material and thickness as the strips 10 and 11 are pressed up against the side edges 25 across the gap 17 and either tack welded to the side edges or clamped in place. Tack welding of the tabs in place helps to maintain proper alignment between the strip ends and provides puddle support during movement of the arc welder (preferably a plasma arc welder) from one of the tabs 25 along the entire length of the joint onto the other tab.

A plasma arc welder (PAW) utilizes a non-consumable tungsten electrode 30 (see FIG. 6) to transfer energy to the strip ends being joined. The electrode 30 of the PAW process is surrounded by a nozzle 31 supplied with plasma gas that is heated by the electrode and ionized to conduct electricity. This high temperature ionized gas, or plasma column 32, is forced through the nozzle orifice 33 to pierce the strip material. A shielding gas 34 flows through another nozzle 35 surrounding the plasma gas nozzle 31 to the outside of the plasma column 32 to shield the weld puddle from contamination during solidification as well known in the art. Also, additional shield gas 36 is supplied to the back of the weld through backing gas ports 37 in the backing plate 15 as further well known in the art. As the weld is made, additional filler material is added in conventional manner from the upper surface of the weld.

Penetration for the plasma column becomes more difficult for thicker strip material (having a thickness for example of approximately 0.200 inch or more). Also, strip end preparation becomes more critical and the weld bead geometry becomes more funnel shaped when welding thicker strip material. During shearing of the strip ends, only a portion of the thickness of the strip material (i.e., approximately one-third) is actually cut by the shear blade and the rest of the strip thickness fails because the material shears apart. A slight curve is produced in the sheared joint due to the space between the shear blades which is necessary to shear carbon steel. These slight imperfections in the sheared strip ends do not allow perfect contact between the strip end edges. In some cases these imperfections can cause a gap of as much as 0.008 inch between the strip end edges in some areas while other areas may actually be touching.

One way to eliminate the strip end edge imperfections would be to machine the strip end edges to provide a perfect fit-up. However, to do that would be both time consuming and difficult for heavy strip. In addition, the problem of not having sufficient penetration is prevalent when a perfect fit-up of the strip end edges is achieved. Proper alignment of the electrode to the joint is imperative to compensate for the fact that the joint edges are neither perpendicular nor perfectly straight. Proper alignment is difficult because only the top of the joint is accessible during welding. Further problems arise with unmachined joints because some areas are under-filled where the strip end edges are gapped, and other areas are over-filled where the strip end edges are touching. This problem is especially apparent in the root of the joint where the weld bead is very narrow, and small variations in gap width can cause a weakness in the weld area and hence a premature failure in the final product.

These penetration and fit-up problems are solved in accordance with the present invention, in that the consumable insert 16 provides a gap 17 between the strip end edges 12, 13 which allows for full arc penetration, and also provides a supply of filler material to the full thickness of the weld, especially at the root. Also, having the consumable insert 16 extend the full thickness of the strips and a predetermined depth below the lower surface of the strip ends makes it possible to eliminate under and over-fill problems in the weld cap and root. The consumable insert is relatively thin as aforesaid, whereby it quickly melts when the plasma gas column 32 comes into contact with the consumable insert. This makes it easier to penetrate at the forefront of the weld and allows for consistent penetration and lower overall heat input into the strip material.

As the plasma column 32 progresses to the left as shown in FIG. 6, molten metal which includes the base strip material, the consumable insert 16 and added consumable weld wire 38 flows around the plasma column and begins to solidify at the back. As mentioned previously, the cross sectional geometry of the weld becomes more funnel shaped as the material gets thicker. With this change in geometry comes a slight variation in chemistry through the weld. By using a consumable insert 16 in accordance with the present invention, weld consumable is supplied to the entire thickness of the joint 14. In addition, the portion of the consumable insert 16 extending below the lower surface of the strip ends produces an extra large root puddle 42 in front of the solidified root 43 as schematically shown in FIG. 7.

In areas where there are small gaps between the strip end edges (caused by imperfections produced during shearing of the strip ends) and more weld metal is needed to fill the void, the solidifying weld puddle 44 contracts and pulls material from the root puddle 42. In areas where the strip end edges are butted tight up against the consumable insert 16, the excess weld consumable remains in the root 43 and is subsequently ground off during the finishing process. Also, because a lower heat input is necessary to introduce and maintain steady penetration, a finer grain structure similar to that of the base strip material and lower heat affected zone hardness are produced which improve fatigue resistance and chemical resistance of the weld joint.

Modifications may be made to the consumable insert chemistry by the addition of alloying elements to improve weldability, ductility and performance of the weld, especially in the root.

Upon completion of the strip end weld 14, the weld may be radiographed to make certain the weld is of the desired high quality so that the weld can be left in the finished product. If the weld does not meet the criteria for a high quality weld, the weld may be cut out and remade in substantially the same manner previously described.

Once it is determined that the weld is of the desired high quality, any excess weld reinforcement 45 (shown in FIG. 8) is removed from the upper and lower surfaces of the joined strip ends 12 and 13 by grinding and/or planishing the weld 14 to finish smooth the weld and make the thickness of the weld closely correspond to the thickness of the base strip material. Then the weld is stress relieved and the tabs 26 are removed and the side edges 25 of the strip ends are ground square and deburred in the region of the weld as needed to make the width of the strip material at the weld closely correspond to the width of the base strip material. Next the strip end weld may be checked for surface hardness and thickness and width by measuring the thickness at the edges and in the center to verify that the strip end weld is substantially the same as the thickness of the base strip material throughout its width. Finally, the weld may be etched as desired.

From the foregoing, it will be apparent that the method of joining the ends of metal strip material using a consumable insert in accordance with the present invention will improve the penetrating ability of the arc welder by providing a gap in the weld joint. In addition, it will provide a consistent root fill by adding filler material to the root of the weld if needed, and will provide a more uniform mixture of base material and filler material by supplying filler material to the full thickness of the weld. Moreover, the consumable insert will require less heat input which will improve fatigue life and chemical resistance of the weldment.

Changes may also be made to the consumable insert chemistry to produce improved properties in the weldment. Also, changes in the size and placement of the consumable insert may be made to control the shape and integrity of the weld root.

The continuous length metal strip material produced by joining the strip ends together in accordance with the present invention may be used anywhere that continuous milling is performed on metal strip material, for example, in the manufacture of continuous length coiled tubing 46 in which the side edges 25 of the joined strips are welded together to form a longitudinal seam 47, and the strip end weld 14 runs helically around the tubing as schematically shown in FIG. 9. Such tubing may be wound onto a reel or spool and used for example in the oil and gas well servicing industry or for flow lines.

Although the invention has been shown and described with respect to a certain preferred embodiment, it is obvious that equivalent alterations and modifications will occur to others skilled in the art upon the reading and understanding the specification. The present invention includes all such equivalent alterations and modifications, and is limited only by the scope of the claims.

What is claimed is:

1. A method of welding steel strip ends together comprising the steps of bringing the strip ends into alignment with each other, positioning a consumable insert of weld filler material of predetermined thickness between the strip ends to establish a predetermined gap between the strip ends to facilitate full arc penetration of the strip ends during welding, locating the consumable insert between the strip ends such that the consumable insert extends a predetermined distance below a lower surface of the strip ends to eliminate any under supply of weld material at a root of the weld to be formed between the strip ends, and arc welding the strip ends together across the entire width of the strip ends during which the portion of the consumable insert extending below the lower surface of the strip ends provides a supply of weld material at the weld root.

2. The method of claim 1 wherein the consumable insert extends the full thickness of the strip ends across the entire width of the strip ends.

3. The method of claim 2 wherein a portion of the consumable insert initially extends above an upper surface of the strip ends, further comprising the step of removing the portion of the consumable insert extending above the upper surface of the strip ends so that the upper surface of the consumable insert is flush with the upper surface of the strip ends prior to the welding step.

4. The method of claim 1 further comprising the step of adding additional filler material to the upper surface of the weld during the welding step.

5. The method of claim 1 further comprising the step of finishing the strip end weld to a thickness and width closely corresponding to the thickness and width of the strip ends.

6. The method of claim 1 further comprising the step of placing metal run-on and run-off tabs of substantially the same thickness as the strip ends against side edges of the strip ends at the gap after the consumable insert positioning and locating steps, and moving an arc welder from one of the tabs across the entire width of the strip ends and onto the other tab during the welding step.

7. The method of claim 6 further comprising the step of tack welding the tabs to the side edges of the strip ends prior to the welding step.

8. The method of claim 1 further comprising the step of shearing the strip ends at supplementary angles other than 90° prior to the consumable insert positioning and locating steps.

9. The method of claim 8 wherein one of the supplementary angles is between approximately 15° and 45°.

10. The method of claim 1, further comprising the step of finishing the root and cap of the weld to make the weld flush with the strip ends.

11. The method of claim 1 wherein a plasma arc welder is used to weld the strip ends together.

12. The method of claim 1 wherein the consumable insert has a thickness of between approximately five percent and ten percent of the thickness of the strip ends.

13. The method of claim 1 wherein the strip ends have a thickness of between approximately 0.134 inch and 0.250 inch and the consumable insert has a thickness of approximately 0.020 inch.

14. The method of claim 1 wherein the strip ends have a thickness of approximately 0.134 inch or less and the consumable insert has a thickness of approximately 0.010 inch.

15. The method of claim 1 wherein the chemistry of the consumable insert is controlled to control certain properties of the weld.

16. The method of claim 1 wherein the size and placement of the consumable insert between the strip ends are controlled to control the shape and integrity of the weld root.

17. A method of joining the ends of two or more lengths of steel strips together comprising the steps of shearing the strip ends at supplementary angles, bringing the strip ends into alignment with each other, placing a consumable insert of weld filler material between the full thickness of the strip ends and below the lower surface of the strip ends a predetermined depth to establish a predetermined gap between the strip ends thus allowing for full arc penetration of the strip ends and providing a supply of the filler material to the root of the weld to be formed between the strip ends, arc welding the strip ends together across the full width of the strip ends from one side to the other during which the consumable insert eliminates any under supply of weld material at the weld root, and finishing the strip end weld to a thickness and width substantially corresponding to the thickness and width of the strip ends adjacent the strip end weld.

18. The method of claim 17 wherein a plasma arc welder is used to weld the strip ends together, and additional weld filler material is added to an upper surface of the weld during the welding step.

19. A method of making a continuous length of seam welded coilable tubing from continuous strip material formed by joining the ends of two or more metal strips together according to claim 17 further comprising the step of welding the strip side edges together to form a longitudinal weld seam.

20. The method of claim 19 wherein the strip ends are sheared at supplementary angles other than 90° prior to joining the strip ends together, whereby the strip end weld runs helically around the tubing formed from the continuous strip material.

* * * * *